(12) United States Patent
Klein et al.

(10) Patent No.: US 10,697,441 B2
(45) Date of Patent: Jun. 30, 2020

(54) METHOD FOR MAKING AN EQUIPOTENTIAL BONDING CONNECTION ON A WIND TURBINE ROTOR BLADE AND WIND TURBINE ROTOR BLADE HAVING AN EQUIPOTENTIAL BONDING CONNECTION

(71) Applicant: Nordex Energy GmbH, Hamburg (DE)

(72) Inventors: Hendrik Klein, Rostock (DE); Thomas Lipka, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 109 days.

(21) Appl. No.: 15/853,269

(22) Filed: Dec. 22, 2017

(65) Prior Publication Data
US 2018/0180032 A1   Jun. 28, 2018

(30) Foreign Application Priority Data
Dec. 22, 2016   (EP) .................................... 16206465

(51) Int. Cl.
*F03D 80/30*   (2016.01)
*F03D 1/06*   (2006.01)

(52) U.S. Cl.
CPC ........... *F03D 80/30* (2016.05); *F03D 1/0675* (2013.01); *F05B 2230/60* (2013.01); *Y02E 10/721* (2013.01); *Y02P 70/523* (2015.11)

(58) Field of Classification Search
CPC ........ F03D 80/00; F03D 80/30; F03D 1/0675; F03D 1/0658; H02G 13/00; H02G 13/40;
(Continued)

(56) References Cited

U.S. PATENT DOCUMENTS 7,651,320 B2   1/2010 Hansen
8,105,035 B2 *   1/2012 Bertelsen ............... H02G 13/00
29/889.7

(Continued)

FOREIGN PATENT DOCUMENTS

CN   203430704 U   2/2014
EP   2930356 A1   10/2015
(Continued)

*Primary Examiner* — Kenneth J Hansen
*Assistant Examiner* — Justin A Pruitt
(74) *Attorney, Agent, or Firm* — Walter Ottesen, P.A.

(57) ABSTRACT

The invention is directed to a method for making an equipotential bonding connection between two components of a lightning protection arrangement of a wind turbine rotor blade. The method includes providing a wind turbine rotor blade having two rotor blade half shells having respective connection and fastening units connected to corresponding ones of the two components of the lightning protection arrangement. A space is present in the interior of the rotor blade between the two connection and fastening units. A connection conductor is introduced from outside of the rotor blade through a through opening in one of the two connection and fastening units into the interior space of the wind turbine rotor blade. The two ends of the connection conductor are fastened to corresponding ones of the connection and fastening units such that the connection conductor bridges the interior space along an essentially linear imaginary line.

16 Claims, 6 Drawing Sheets

(58) Field of Classification Search
CPC ..... H02G 13/80; Y02P 70/523; Y02E 10/721; F05B 2230/60
USPC .......................................... 416/39
See application file for complete search history.

(56) References Cited

U.S. PATENT DOCUMENTS

| | | |
|---|---|---|
| 8,133,031 B2 | 3/2012 | Arinaga et al. |
| 8,182,227 B2 | 5/2012 | Jacobsen et al. |
| 8,727,723 B2 | 5/2014 | Flemming et al. |
| 10,199,816 B2 | 2/2019 | Ohlerich |
| 2009/0053062 A1* | 2/2009 | Arinaga ............... H02G 13/00 416/146 R |
| 2009/0196751 A1 | 8/2009 | Jacobsen et al. |
| 2009/0257882 A1 | 10/2009 | Olsen |
| 2011/0182731 A1* | 7/2011 | Naka ..................... F03D 80/30 416/1 |
| 2015/0292487 A1 | 10/2015 | Ohlerich |
| 2016/0222945 A1 | 8/2016 | Shiraishi et al. |
| 2016/0245264 A1 | 8/2016 | Sogaard et al. |
| 2016/0258423 A1 | 9/2016 | Whitehouse et al. |
| 2017/0268481 A1* | 9/2017 | Enevoldsen ............ F03D 13/10 |
| 2018/0030750 A1* | 2/2018 | Ollgaard ............... E06B 1/6046 |
| 2018/0180031 A1 | 6/2018 | Klein et al. |

FOREIGN PATENT DOCUMENTS

| | | |
|---|---|---|
| EP | 2930358 A1 | 10/2015 |
| WO | 2011080177 A1 | 7/2011 |
| WO | 2014200333 A1 | 12/2014 |
| WO | 2016165714 A1 | 10/2016 |
| WO | 2018095660 A1 | 5/2018 |

* cited by examiner

METHOD FOR MAKING AN EQUIPOTENTIAL BONDING CONNECTION ON A WIND TURBINE ROTOR BLADE AND WIND TURBINE ROTOR BLADE HAVING AN EQUIPOTENTIAL BONDING CONNECTION

CROSS REFERENCE TO RELATED APPLICATION

This application claims priority of European patent application no. 16206465.3, filed Dec. 22, 2016, the entire content of which is incorporated herein by reference.

FIELD OF THE INVENTION

The invention relates to a method for producing an equipotential bonding connection between two components of a lightning protection arrangement of a wind turbine rotor blade, as well as to a wind turbine rotor blade which includes such a connection.

BACKGROUND OF THE INVENTION

Wind turbine rotor blades include lightning protection arrangements for diverting lightning currents, which lightning protection arrangements comprise multiple electrically conducting components, for example lightning receptors and lightning conductors. In the case of a lightning strike, very high currents flow through these components for a very short time, which can result in high potential differences on account of electromagnetic induction. In order to avoid flashovers between the different components and consequently resultant damage to the wind turbine rotor blade, equipotential bonding connections are produced, as a rule, in particular between conductors that are arranged in parallel. Potential differences are equalized by means of the connections. At the same time, where applicable, they can cause a lightning current to divide into multiple components or can guide the entire lightning current. Two fundamentally different methods have been disclosed to produce the equipotential bonding connections.

On the one hand, connection conductors arranged in the interior of the wind turbine rotor blade can be used. U.S. Pat. No. 7,651,320, for example, shows a wind turbine rotor blade with lightning receptors in the form of metal threaded bolts which are arranged in a rotor blade wall and are screw-connected to various connecting elements. These include connection conductors which are fastened to a web and in each case connect together one lightning receptor on a suction side and one lightning receptor on a pressure side. At the same time, the connection conductors are connected to electrically conducting main spar caps.

On the other hand, it is possible to create an equipotential bonding connection which is arranged on the outside of the wind turbine rotor blade. An example has been disclosed in EP 2 930 358 A1, in which lightning conductors arranged on the pressure and suction side are connected by means of equipotential bonding bars which are guided around the profile trailing edge.

U.S. Pat. No. 8,182,227 has disclosed a wind turbine rotor blade with lightning receptors which are integrated into a wall of the wind turbine rotor blade. In one embodiment, one of the lightning receptors comprises a removable portion which closes an access opening to an interior of the wind turbine rotor blade. A connection conductor, which extends along a web in the interior of the wind turbine rotor blade, is to be able to be fastened through the access opening on a lightning receptor which is situated opposite the access opening.

WO 2014/200333 A1 has disclosed a device for fastening a lightning receptor on a wall of a wind turbine rotor blade. An inner and an outer fastening element is used for this purpose. The lightning receptor can either be fastened on the inner fastening element from the outside of the rotor blade, or together with the inner fastening element, on the outer fastening element from the inside of the rotor blade.

SUMMARY OF THE INVENTION

Proceeding from here, it is an object of the invention to provide a method which facilitates the production of an equipotential bonding connection between two components of a lightning protection arrangement of a wind turbine rotor blade, as well as a wind turbine rotor blade which includes an equipotential bonding connection which is simple to produce.

The method serves for making an equipotential bonding connection between two components of a lightning protection arrangement of a wind turbine rotor blade and includes the following steps which are to be carried out in the specified order set forth below:

a) providing a wind turbine rotor blade, which comprises two rotor blade half shells, each with a connection and fastening unit which is connected or connectable to one of the two components of the lightning protection arrangement, wherein a space is realized in the interior of the wind turbine rotor blade between the two connection and fastening units;

b) inserting a connection conductor from an outside surface of the wind turbine rotor blade through a through opening in one of the two connection and fastening units into the interior of the wind turbine rotor blade; and, c) fastening each of the two ends of the connection conductor to one of the connection and fastening units such that the connection conductor bridges the space.

The connection and fastening units in each case form an interface between the connection conductor and one of the two components of the lightning protection arrangement. They comprise fastening means for the fastening of one end of the connection conductor, for example a thread for producing a screw connection or a clamp for producing a clamping connection. Complementarily realized fastening means can be realized on the ends of the connection conductor, for example also a thread, an eyelet or a clamping portion. It is consequently simple to connect each end of the connection conductor to an associated connection and fastening unit.

Each connection and fastening unit is connected or connectable to a component of the lightning protection arrangement. In this case, it is unimportant to the invention whether a direct or indirect connection is used, for example by means of a cable or another connecting piece. Included are also connection and fastening units which are realized integrally with the assigned components of the lightning protection arrangement. For example, a fastening portion with a thread or a bore, which forms the connection or fastening device, can be realized on a lightning protection arrangement.

In the case of the invention, one of the two connection and fastening units comprises a through opening, through which the connection conductor is inserted from the outside. The equipotential bonding connection can consequently be produced at a point in time at which substantial production steps for the wind turbine rotor blade have already been completed. In particular, apart from the through opening, no further access to the interior of the wind turbine rotor blade is necessary such that the two rotor blade half shells can already be assembled together before the connection conductor is mounted. This is particularly advantageous to the regions of the rotor blade which are no longer accessible from the inside once the rotor blade half shells have been joined together such as, for example, the blade tip region. The solution offers further important advantages. On the one hand, critical production steps, such as, in particular, the joining together of two half shells, are not made more difficult by the connection conductor. Neither is it necessary to monitor the correct arrangement of the connection conductor during the critical production steps, nor is there a risk of damaging the connection conductor at the same time. On the other hand, mounting the connection conductor "in retro" makes extensive maintenance and control, including replacement of the connection conductor, possible at a subsequent point in time.

In one configuration, the step b) is carried out once the two rotor blade half shells have been connected together. The connection conductor is therefore mounted or inserted into the wind turbine rotor blade "in retro". It is obvious that step c) can be carried out in particular subsequently, that is, after step b).

In one configuration, one of the two components is a lightning receptor which after step c) is fastened on one of the connection and fastening units and/or is connected thereto. It is accordingly possible to utilize the equipotential bonding connection produced using the method according to the invention for a lightning receptor mounted in retro.

In one configuration, in step a) two rotor blade half shells are connected together, wherein at least one of the two connection and fastening units has been embedded beforehand into a wall of one of the rotor blade half shells and has been connected to one of the two components of the lightning protection arrangement. The rotor blade half shells can be, for example, a pressure-side and a suction-side half shell of the wind turbine rotor blade. However, a different division which extends substantially in the longitudinal direction of the wind turbine rotor blade can also be provided, for example it can be divided into a profile-leading-edge-side and a profile-trailing-edge-side half shell. In this way, both connection and fastening units can also be embedded in each case into one of the half shells or integrated in another manner and connected to an assigned component of the lightning protection arrangement prior to the connecting of the two half shells. Once the half shells have been connected, the only thing still to be done is to insert and fasten the connection conductor.

In one configuration, the at least one connection and fastening unit is arranged between two cover layers of the wall during the embedding process. When the wall is configured as a sandwich construction, the connection and fastening unit takes on the role of a core material. As a result, a particularly sturdy configuration is achieved, the connection and fastening unit not weakening the structure in a significant manner.

In one configuration, one of the two components is a lightning protector conductor, which is integrated into the rotor blade half shell, in which the at least one connection and fastening unit is embedded. The connection between connection and fastening unit and lightning conductor can be produced, for example, with a cable or another such connecting piece, in particular as long as unobstructed access to the inside of the rotor blade half shell is still possible.

In one configuration, the through opening used in step b) is exposed from the outside of the wind turbine rotor blade once the connection and fastening unit, which comprises the through opening, has been located from the outside of the wind turbine rotor blade. For example, it is possible for a connection and fastening unit to be concealed only by a thin laminate layer or a cover layer of a wall which has been erected as a sandwich construction and to be able to be visible through the layer from the outside. It is consequently possible to produce the wind turbine rotor blade with a perfect, aerodynamically effective outside surface and to provide it with a connection and fastening unit, the through opening of which is not exposed until later from the outside.

In one configuration, a cavity of the connection and fastening unit, which is closed in an air-tight manner, is bored out for exposing the through opening, wherein the connection and fastening unit includes the through opening. A lateral wall of the cavity then forms the through opening. The particular advantage consists in that the connection and fastening unit is able to be easily integrated into a wall of the wind turbine rotor blade without the through opening being impaired, for example as a result of the ingress of plastics material during a vacuum infusion process. This applies correspondingly to elements arranged in the cavity, for example connecting means for connection to the connection conductor or to one of the components of the lightning protection arrangement.

In one configuration, the other of the two connection and fastening units also comprises a through opening and in step b) one of the two ends of the connection conductor is guided through the through opening onto the outside of the wind turbine rotor blade again. Accordingly, the connection conductor can be handled from the outside during the mounting procedure in the region of both connection and fastening units. The correct fastening of the connection conductor is further facilitated as a result.

In one configuration, in step b) a guide tube is first of all guided through the two through openings, in which guide tube the connection conductor is arranged or through which guide tube the connection conductor is pushed forward, the guide tube then being removed again. In this way, the connection conductor is able to be inserted in a particularly simple manner and, where applicable, it is also able to bridge a larger space.

In one configuration, in step b) a guide wire or a guide cable is first of all guided through the two through openings, by way of which guide wire or guide cable the connection conductor is guided through the two through openings. This is an alternative to using a guide tube which also makes it particularly simple to insert the connection conductor. A combination of guide tube and guide wire and/or guide cable is also possible.

In one configuration, in step c) a length of the connection conductor is chosen in such a manner and the two ends of the connection conductor are fastened in such a manner that the connection conductor, which is fastened at both ends, spans the space in a substantially straight-lined manner. "A substantially straight-lined manner" means that roughly as short as possible a connection is produced, slight deviations from a precisely straight-lined progression of the connection conductor, which are produced, for example, from manufacturing tolerances or from end portions of the connection conductor which are arranged between the two connection and fastening units in a manner that deviates from a straight line, being possible. In all cases, a direct connection, which is advantageous from electrotechnical viewpoints, is obtained. In addition, the connection conductor is prevented from being able to move more than just slightly during the operation of the rotor blade, which prevents failure on account of material fatigue.

In one configuration, in step c) the two ends of the connection conductor are fastened in each case from the outside of the wind turbine rotor blade to one of the two connection and fastening units. Accordingly, once the connection conductor has been inserted, no further access to the interior of the wind turbine rotor blade is necessary and fastening is particularly simple.

In one configuration, in step c) at least one of the two ends of the connection conductor is screw-connected to a perforated disk, the diameter of which is greater than the through opening and which abuts against an outside surface of the relevant connection and fastening unit. A connection with large contact faces and a correspondingly high current carrying capacity that is simple to mount is produced as a result. The perforated disk can be screw-connected to the connection and fastening unit from the outside. The screw-connection between the perforated disk and the end of the connection conductor can be carried out, for example, by way of a threaded bolt, which is guided through the aperture of the perforated disk and is screwed into an internal thread in an end face of a connection piece of the connection conductor that forms the end.

In one configuration, one or multiple spacers are arranged between the perforated disk and the relevant connection and fastening unit. As a result, the connection conductor can be arranged and/or clamped in a straight line or roughly in a straight line between the two connection and fastening units.

The wind turbine rotor blade has two rotor blade half shells, which each comprise a connection and fastening unit, which is connected to a component of a lightning protection arrangement, and to a connection conductor which is arranged in the interior of the wind turbine rotor blade and comprises two ends which are each fastened to one of the connection and fastening units, the connection conductor spanning a space arranged between the two connection and fastening units in a substantially straight-lined manner.

The two connection and fastening units can be arranged, in particular, located opposite one another when the two rotor blade half shells are connected together as provided.

Reference is made to the above-mentioned comments on the method which apply correspondingly to the features and advantages of the wind turbine rotor blade. It is obvious that the features of the individual elements explained in conjunction with the method can be combined in each case with the wind turbine rotor blade. This relates in particular to the explained features of the connection and fastening unit and of the connection conductor relating to the object, as well as to the configuration of the wind turbine rotor blade, for example produced from half shells or with a wall as a sandwich construction, et cetera.

Further possible characteristics of the elements of the wind turbine rotor blade which can also be used in connection with the method are explained below.

The connection and fastening unit can comprise a cavity which is closed in an air-tight manner and in which connecting means for connection to at least one of the components of the lightning protection system are arranged. The connecting means can be part of the connection and fastening unit and can be already present prior to the integration of the connection and fastening unit into the wind turbine rotor blade. Consequently, once the connection and fastening units have been integrated into the rotor blade, they can be used immediately for connecting or fastening the components of the lightning protection system.

The connection and fastening unit can be realized for the purpose of being integrated into a wind turbine rotor blade, that is, in particular, of being embedded into a wall of the wind turbine rotor blade. In particular, it can be embedded into a plastics material matrix together with reinforcement fibers that are included in the wall, for example in a vacuum infusion process or another such process where the reinforcement fibers and the connection and fastening unit are embedded into an initially liquid, subsequently hardened plastics material.

The components of the lightning protection system are electrically conducting and contribute, when used correctly, to diverting a lightning current. They can include, for example, a lightning conductor, a lightning receptor, an equipotential bonding connection and/or another connection conductor. Connecting a connection and fastening unit to at least two of the components can be provided, in particular, in order to produce an electrical connection between the components. In this case, at least one of the components can be connected and/or fastened by means of connecting means that are arranged in the cavity.

The connection and fastening unit can be provided with suitable dimensions and sufficient dimensional stability in order to be able to be integrated into the wind turbine rotor blade in a particularly simple manner. In particular, when a wall of the wind turbine rotor blade is produced as a sandwich construction, it can replace or form parts of a core material, that is, can be arranged between two cover layers of the wall. Even when considerable forces act on the connection and fastening unit prior to and during the hardening of a liquid plastics material, for example when producing a vacuum, the connection and fastening unit maintains its form such that the production of the wall is not impaired.

The connection and fastening unit can be realized such that, once the connection and fastening unit has been integrated into the wind turbine rotor blade, the cavity can be opened from an outside surface and/or an inside surface of the wind turbine rotor blade. Once the cavity has been opened, the connecting means are accessible from the outside and/or the inside such that the components of the lightning protection system can be easily fastened and connected. In order to create the opening possibility, the connection and fastening unit can comprise, for example, a removable element such as a plug. It is also possible for the connection and fastening unit to comprise a wall which is provided for opening the cavity and for the opening to be carried out by removing the wall, for example as a result of producing a bore through the wall, or by breaking out a portion of the wall that is provided for this purpose.

The connection and fastening unit can comprise a basic body produced from an electrically insulating material and a connection body produced from an electrically conducting material, basic body and connection body being fixedly connected together and the cavity being arranged between the basic body and the connection body. The connecting means are realized on the connection body. The combination of basic body and connection body enables a particularly simple production of the connection and fastening unit with the cavity. The realization of the basic body from a non-electrically conducting material makes it possible for the connection body to be mounted in an electrically insulated manner. In addition, when suitable material is chosen, the basic body can enter into a particularly deep connection with the wall of a wind turbine rotor blade. In particular, an outer circumferential surface of the connection and fastening unit can be formed by the basic body for this purpose.

With the connection and fastening unit in an installation position in a wind turbine rotor blade, the basic body faces an outside surface of the wind turbine rotor blade and the connection body faces an interior of the wind turbine rotor blade. Once the connection and fastening unit has been integrated into the wind turbine rotor blade, the connection body, as a result, is accessible in a particularly simple manner from the inside of the rotor blade, in particular to produce a connection to a lightning conductor. At the same time, the connection body can be electrically insulated from an outside surface of the wind turbine rotor blade by means of the basic body such that direct lightning strikes in the connection body are countered.

The electrically insulating material can be a fiber-reinforced composite. As a result, the connection and fastening unit can be embedded in an optimum manner into a wall of a wind turbine rotor blade. At the same time, the basic body maintains a high degree of dimensional stability and can be processed using the same methods as further components of the wind turbine rotor blade, which, where applicable, are produced from the same or a similar material.

The connecting means can comprise a first connecting means which comprises an internal thread in the connection body, the internal thread being concealed by a wall of the basic body which is at a distance from the connection body in the region of the internal thread. When viewed from the outside, the internal thread is situated behind the wall. The first connecting means is provided for the mounting of a lightning receptor. This can be screwed directly into the internal thread once the wall has been removed or opened, as a result of which an electrical and mechanical connection is produced at the same time between the lightning receptor and the connection body. When opening the cavity, the wall of the basic body can be removed in full or in part. As it maintains a distance from the connection body in the region of the internal thread, the wall can be removed in a particularly simple manner without the internal thread being damaged. In addition, as a result of the distance, when the basic body and the connection body are joined together (when producing the connection and fastening unit), portions of the wall are prevented from sticking to the connection body, which would later have to be removed. The distance from the internal thread or from the connection body can be maintained both in the axial and in the radial direction (in particular radially outward), in each case with reference to the internal thread.

The connection body can comprise the through opening which is closed in an air-tight manner by a removable blind plug. The blind plug can close the cavity in the connection and fastening unit at the same time. Once the connection and fastening unit has been integrated into a wind turbine rotor blade, the blind plug can be removed in order to expose the through opening. On the one hand, a further access possibility to the cavity, in particular from an inside surface of the wind turbine rotor blade, is created as a result. On the other hand, it is possible to open the connection and fastening unit both from the outside and from the inside of the wind turbine rotor blade such that a through opening is provided through the entire connection and fastening unit and through a wall of the rotor blade into which the connection and fastening unit is integrated. As a result, the connection and fastening unit, in particular from an outside surface of the rotor blade, provides access to the interior thereof which is able to be utilized for various maintenance and installation work.

The connection and fastening unit can be combined with a lightning receptor which is connectable to the first connecting means and comprises an outer diameter which is greater than an outer diameter of the connection body. The matching of the dimensions of the lightning receptor to the connection body leads to the connection body being effectively shielded, as a result of which a lightning strike past the lightning receptor directly into the connection body is avoided. The lightning receptor is the at least one component of the lightning protection system which is connected to the connecting means in the cavity.

The connection and fastening unit can comprise a stop against which the lightning receptor abuts when it is connected to the connection body via the first connecting means. A large-surface contact, in particular with a contact area of $20 \text{ mm}^2$ or more, can be produced in particular in the region of the stop. This ensures, on the one hand, that the connection between lightning receptor and connection and fastening unit has a high current carrying capacity. On the other hand, the stop ensures that, when connected correctly to the connection body by means of the first connecting means, the lightning receptor is at a defined distance from the connection body or the connection and fastening unit. The stop can be arranged such that the lightning receptor closes off roughly flush with an outside surface of the wind turbine rotor blade when the connection and fastening unit is arranged in the installed position provided and the lightning receptor is correctly connected to the first connecting means.

The connecting means can include a second connecting means which is arranged in a surface of the connection body that points into the cavity and comprises a bore with an internal thread. The second connecting means serves for the connection of an electric line. The electric line can be, for example, a lightning conductor or a connection conductor, which produces a connection between the connection and fastening unit and a lightning conductor (main conductor). As an alternative to this, the electric line can be an equipotential bonding connection between two connection and fastening units. In this case, each one of the two connection and fastening units can be integrated into one of the two half shells of the wind turbine rotor blade.

It is possible to provide a third connecting means which is arranged on a surface of the connection body that points into the interior of the wind turbine rotor blade and includes a bore with an internal thread. The third connecting means serves for the connection of a further electric line. It can be arranged outside the cavity that is closed in an air-tight manner. The further electric line can realize, for example, an equipotential bonding connection between the connection and fastening unit and a lightning conductor that is embedded in the shell of the wind turbine rotor blade.

BRIEF DESCRIPTION OF THE DRAWINGS

The invention will now be described with reference to the drawings wherein.

DESCRIPTION OF THE PREFERRED EMBODIMENTS OF THE INVENTION

First of all, FIGS. 1 to 6 explain how, in the case of the method according to the invention, the step of providing a wind turbine rotor blade can be carried out. The wind turbine rotor blade includes two connection and fastening units 32, which are each connected or connectable to one of the two components of the lightning protection arrangement, and a space which is arranged in the interior of the wind turbine rotor blade between the two connection and fastening units 32.

Figure 1:
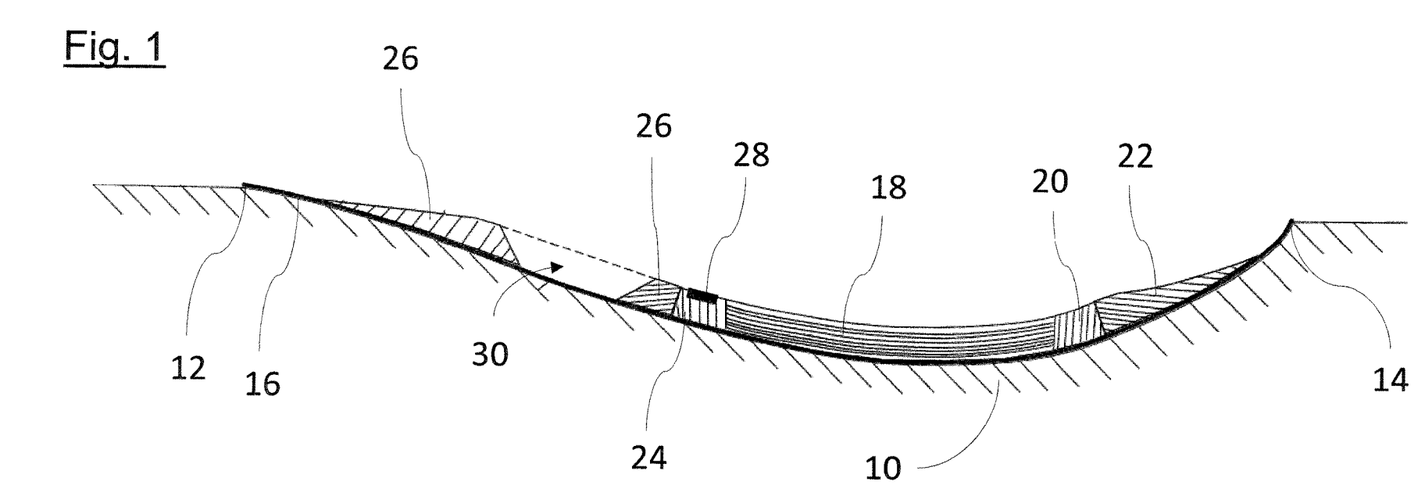
FIGS. 1 to 3 show the integration of a connection and fastening unit into a half shell of a wind turbine rotor blade, shown in each case in a schematic cross section at various points in time.

FIG. 1 illustrates the placing of various materials into a manufacturing mold 10 during the production of a half shell for a wind turbine rotor blade. The manufacturing mold 10 is shown in cross section and, between a profile trailing edge 12, shown in the left-hand side in FIG. 1, and a profile leading edge 14, shown on the right in FIG. 1, of a wind turbine rotor blade that is to be produced, comprises a curved progression which corresponds to an aerodynamic profile of the wind turbine rotor blade.

A first cover layer 16 produced from reinforcement fibers, for example one or multiple layers of a woven fabric, in particular produced from glass fibers, is situated in the manufacturing mold 10 as the bottommost layer shown in FIG. 1.

Multiple layers of unidirectionally aligned reinforcement fibers, in particular carbon fibers, which extend in the longitudinal direction of the rotor blade and form a main spar cap 18, are arranged roughly midway between the profile trailing edge 12 and the profile leading edge 14. Following the reinforcement fibers of the main spar cap 18 toward the profile leading edge 14 is a first leading-edge-side insert 20 and a second leading-edge-side insert 22. Both of these consist of a core material, for example of a foamed plastics material.

Following the reinforcement fibers of the main spar cap 18 toward the profile trailing edge 12 is a first trailing-edge-side insert 24 and a second trailing-edge-side insert 26. A lightning conductor 28, the top side of which closes off roughly flush with a top side of the first trailing-edge-side insert 24, is arranged in a recess, which is rectangular in cross section, of the first trailing-edge-side insert 24.

The second trailing-edge-side insert 26 comprises a recess 30 which extends over the entire thickness of the second trailing-edge-side insert 26. The recess 30 borders on the first cover layer 16 and, in the example shown, comprises a rotationally symmetrical, conical shape. In a view from above into the manufacturing mold 10, which is not shown, the recess 30 appears circular.

Figure 2:
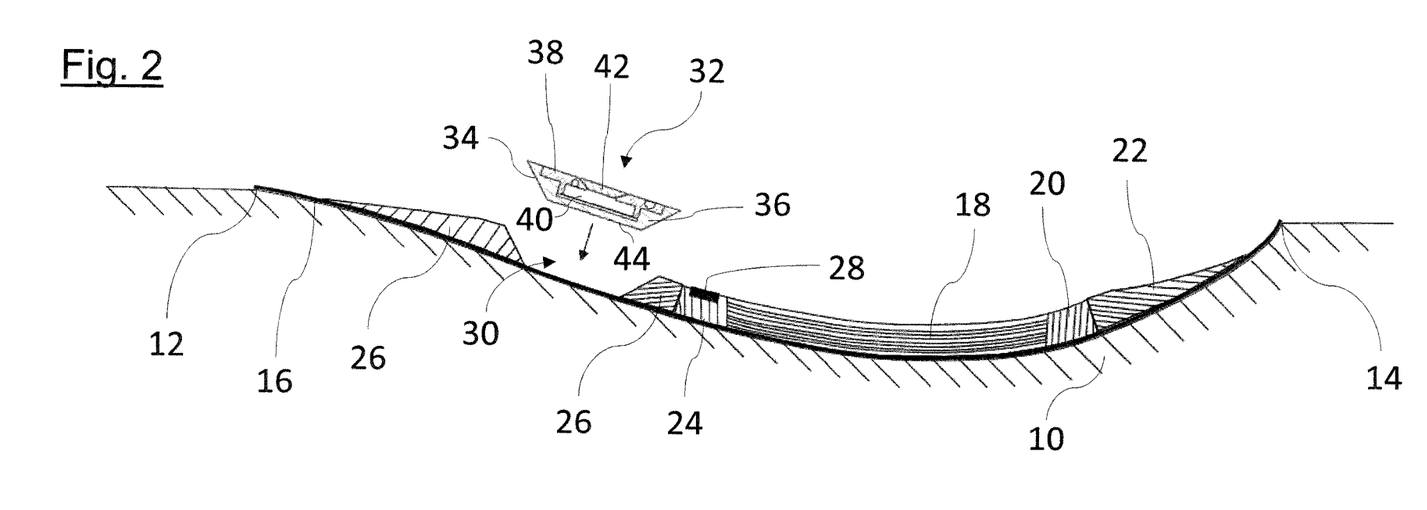

FIG. 2 shows how a connection and fastening unit 32 is inserted into the recess 30 of the second trailing-edge-side insert 26. The connection and fastening unit 32 is disk-shaped overall with a circumferential, conical circumferential surface 34. The connection and fastening unit 32 is formed in a manner that is complementary to the recess 30 in the second trailing-edge-side insert 26.

The connection and fastening unit 32 comprises a basic body 36 produced from an electrically insulating material, for example from a fiber-reinforced plastics material, and a connection body 38. The basic body 36 forms the conical circumferential surface 34 and additionally comprises a circular, substantially planar surface 44, which faces an outside surface of the wind turbine rotor blade to be produced and, once the connection and fastening unit 32 has been inserted into the recess 30, borders on the first cover layer 16.

The connection body 38 consists of an electrically conducting material, for example copper, aluminum or stainless steel, and is realized in a substantially rotationally symmetrical manner. In its center, the connection body 38 comprises a through opening 46 (see FIG. 4) which is closed by a blind plug 42. As a result, the cavity 40 realized between the basic body 36 and the connection body 38 is closed in an air-tight manner.

Figure 3:
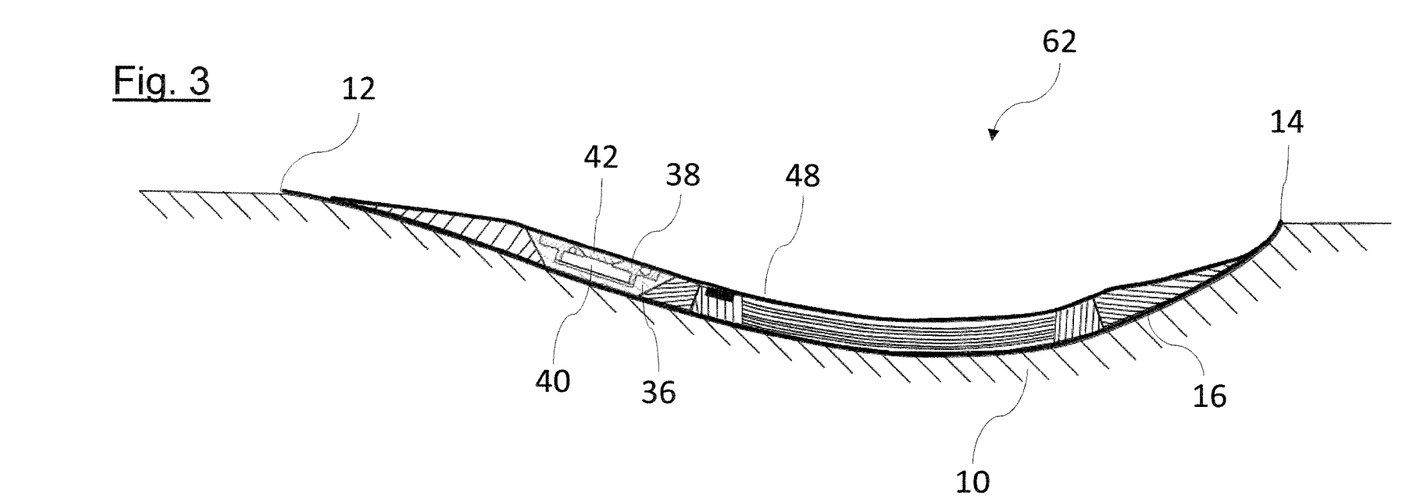

Once the connection and fastening unit 32 has been inserted into the recess 30, the entire arrangement that is situated in the manufacturing mold 10 is covered with a second cover layer 48 produced from reinforcement fibers (see FIG. 3). The reinforcement fibers of the second cover layer 48 can be placed into the manufacturing mold 10 in particular in the form of one layer or multiple layers of a non-woven fabric, for example produced from glass fibers. The connection and fastening unit 32 is embedded between the first cover layer 16 and the second cover layer 48 and there assumes the function of a core material.

A liquid plastics material is then brought into the manufacturing mold 10, in particular in a vacuum infusion process. All the elements situated in the manufacturing mold 10 (as shown in FIG. 3) are embedded into a plastics material matrix as a result. Spaces between the elements situated in the manufacturing mold 10, in particular between the various layers produced from reinforcement fibers, the various inserts 20 to 26 and the connection and fastening unit 32, are filled out with the plastics material and, as a result, are bonded permanently to one another. On account of the air-tight closure of the cavity 40, however, no plastics material passes into the connection and fastening unit 32. Once the plastics material has been brought in, it hardens in the manufacturing mold 10, as a result of which the half shell 62 is substantially finished.

Figure 4:
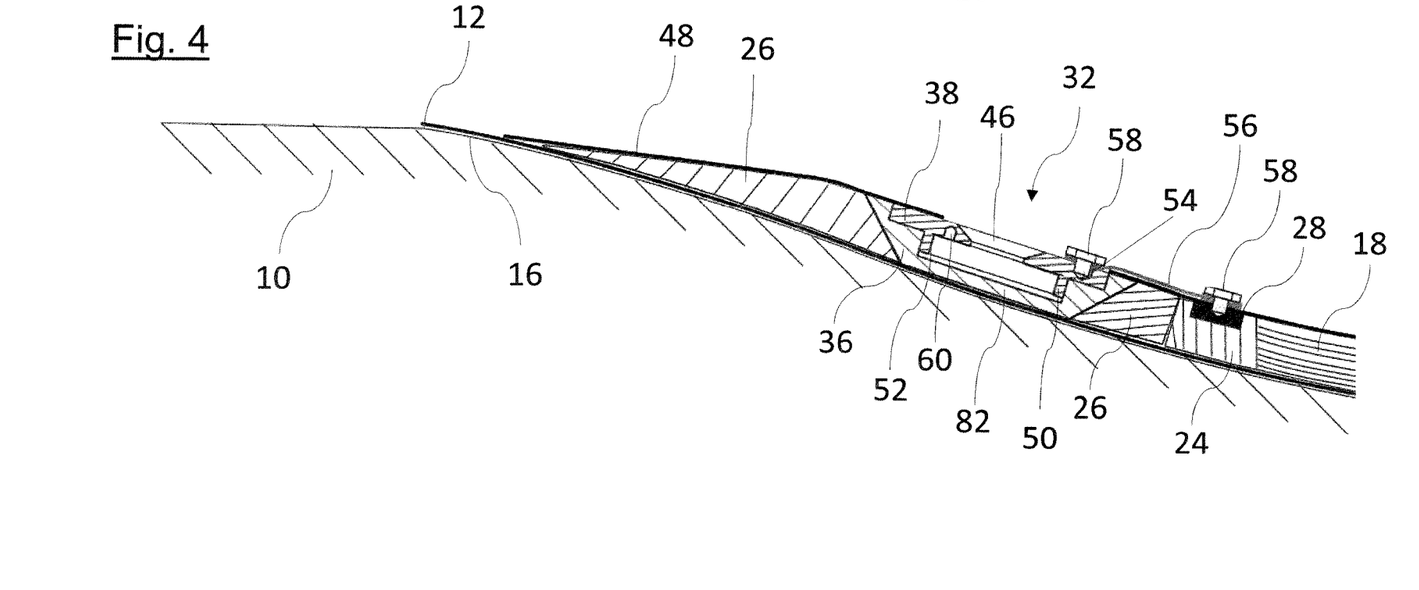
FIG. 4 shows an enlarged detail of the arrangement from FIG. 3 once further productions steps have been carried out.

FIG. 4 shows a detail from FIG. 3, in which the connection and fastening unit 32 is arranged. Once the plastics material has hardened, the second cover layer 48 has been removed in part in the region of the connection and fastening unit 32, in particular above a through opening 46 that is realized in the connection body 38. The blind plug 42, by way of which the cavity 40 inside the connection and fastening unit 32 and the through opening 46 have been closed in an air-tight manner whilst the liquid plastics material was brought in and hardened, has also been removed once the second cover layer 48 has been removed.

It can be seen from FIG. 4 that the connection body 38 comprises a disk-shaped base plate, in the middle of which the through opening 46 is realized. A top side of the base plate faces the second cover layer 48, and also an interior of the wind turbine rotor blade to be formed. The disk-shaped base plate merges on its bottom side into a tubular portion 50, on the inside of which an internal thread 52 is realized.

The internal thread 52 forms the first connecting means of the connection and fastening unit 32. The internal thread 52 is at a distance from a wall 82 of the basic body 36 which conceals the internal thread 52. The distance extends with reference to the internal thread 52 in the axial direction, in the direction toward the first cover layer 16. There is also a distance outward in the radial direction between the free end of the internal thread 52 and the basic body 36.

The connection and fastening unit 32 also comprises second connecting means in the form of a threaded bore 54 on the top side of the disk-shaped base plate of the connection body 38. The second connecting means serve for electrical connection to the lightning conductor 28. FIG. 4 shows to this end that a strip-shaped connecting piece 56 is screw-connected, on the one hand, to the connection body 38 and, on the other hand, to the lightning conductor 28 with in each case a threaded bolt 58.

The connection and fastening unit 32 also comprises third connecting means in the form of a further threaded bore 60, which is arranged inside the tubular portion 50 in an outside surface of the disk-shaped base plate of the connection body 38 that faces the first cover layer 16, adjacent to the through opening 46. All the production steps explained up to now, up to the state shown in FIG. 4, can be carried out inside the manufacturing mold 10.

Figure 5:
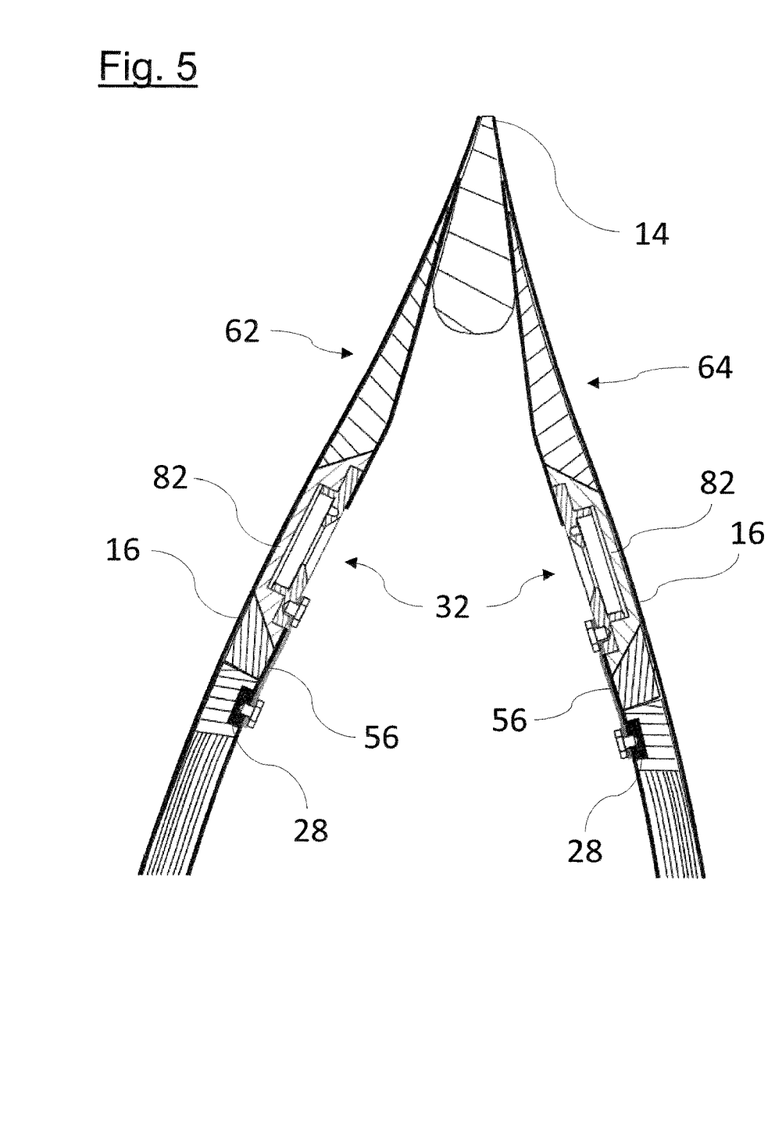
FIG. 5 shows the arrangement from FIG. 4 once joined together with a further half shell, also in a schematic cross-sectional representation.

The half shell produced in the manufacturing mold 10 is then joined with a further half shell 64, as shown in detail in the cross section in FIG. 5. The joining is effected as a result of bonding the two half shells 62, 64, among other things as shown in FIG. 5 in the region of the profile leading edges 14. The further half shell 64 corresponds as regards its configuration to the half shell 62, the production of which has been explained by way of FIGS. 1 to 4, and also comprises a connection and fastening unit 32 and lightning conductor 28 connected thereto. It can be seen that the two connection and fastening units 32 are arranged situated opposite one another.

Figure 6:
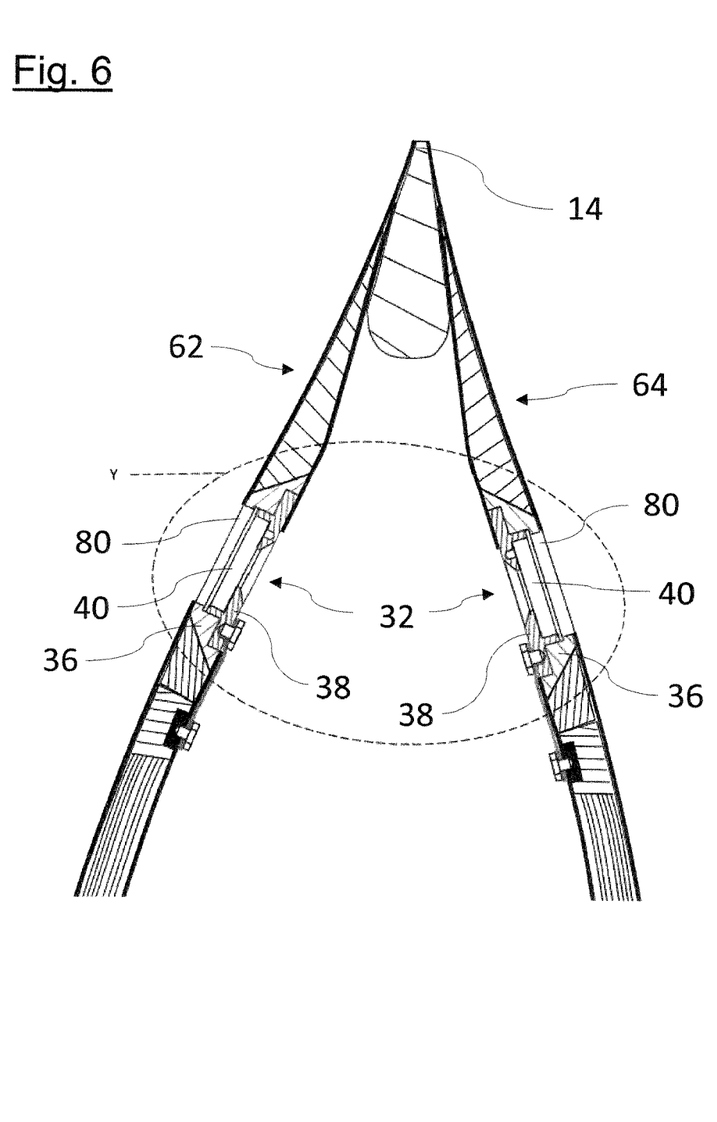
FIG. 6 shows the arrangement from FIG. 5 once the cavities in the two included connection and fastening units have been opened, also in a schematic cross-sectional representation.

FIG. 6 shows the arrangement from FIG. 5 once the two cavities 40 of the connection and fastening units 32 have been opened, in each case from an outside surface of the wind turbine rotor blade that consists of joined half shells 62, 64. To this end, in each case from the outside surface, a bore 80 has been realized through the first cover layer 16 and a wall 82, which forms the circular surface 44 of the corresponding bordering basic body 36, with a diameter which corresponds to a mean diameter of the tubular portion 50 of the connection body 38.

In order to carry out the bore 80 at the desired point, the connection and fastening units 32 can be easily located from the outside of the rotor blade because the connection body 38 or the end faces of the tubular portions 50 thereof and/or the cavities 40 arranged inside thereof and/or the through openings 46 are visible from the outside.

FIG. 6 shows the arrangement from FIG. 4 once the two bores 80 have been produced. The first connecting means in the form of the internal thread 52 are now exposed and are accessible from the outside of the rotor blade. In addition, there is now also an access option into the interior of the rotor blade from the outside of the rotor blade through the through openings 46.

Figures 7, 8:
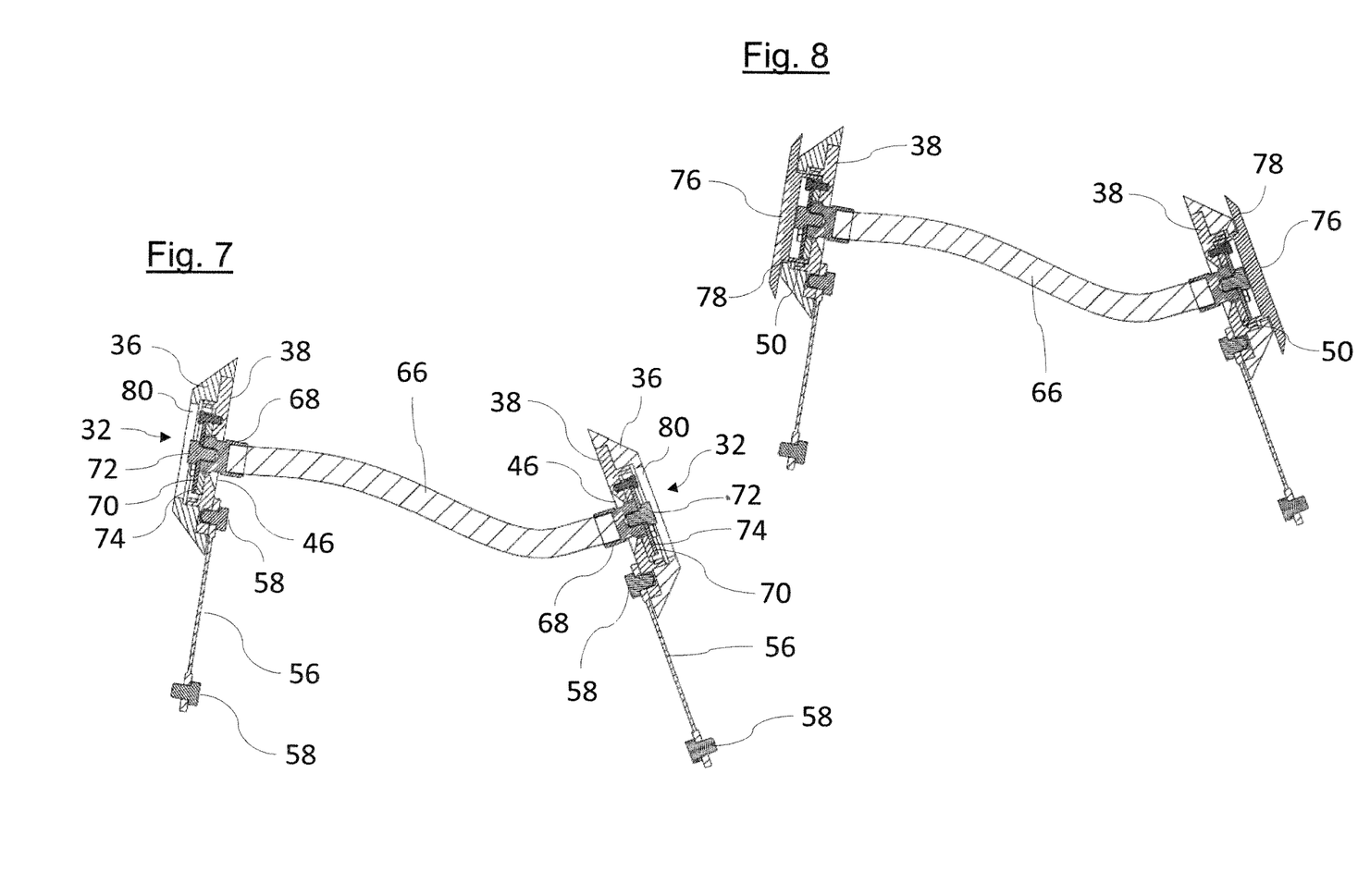
FIG. 7 shows the connection and fastening units from FIG. 6 in addition to further elements of a lightning protection arrangement once an equipotential bonding connection has been produced, also in a schematic cross-sectional representation, the remaining elements of the half shells not being shown.
FIG. 8 shows the arrangement from FIG. 7 once second lightning receptors have been mounted, also in a schematic cross-sectional representation.

FIG. 7 shows the two connection and fastening units 32 which are connected via respective connecting pieces 56 to a lightning conductor 28 which is arranged in the relevant half shell 62, 64 and is not shown in FIG. 7. In addition, FIG. 7 shows a connection conductor 66, which is inserted into the arrangement in FIG. 6, that is, once the two half shells 62, 64 have been joined together into the wind turbine rotor blade, and produces an equipotential bonding connection between the two connection and fastening units 32 and the lightning conductors 28 connected thereto. The ends of the connection conductor 66 are each fastened on one of the connection and fastening units 32, as shown below as an example by way of FIGS. 7 and 8.

The connection conductor 66 is dimensioned such that it extends between the two connection and fastening units 32 through the interior of the rotor blade in a direct line such that it does not require any separate fastening. At its two ends, the connection conductor 66 comprises connection pieces 68 which each comprise an internal thread. The connection pieces 68 are arranged inside the through openings 46 of the connection body 38. A perforated disk 70, which is produced from metal and comprises an opening, through which a threaded bolt 72 is guided and is screwed into an internal thread of a connection piece 68, is arranged on each of the end faces of the connection pieces 68. The perforated disks 70, in turn, abut, where applicable with the addition of one or multiple spacers 74, against an inside of a disk-shaped base plate of a connection body 38 and are screw-connected to the connection body via the further threaded bore 60 (see FIG. 4) which forms a third connecting means. The perforated disks 70 together with the spacers 74 are each arranged inside a cavity 40 of a connection and fastening unit 32.

FIG. 8 shows the arrangement from FIG. 7 once a lightning receptor 76 has been screwed into each of the connection and fastening units 32. Each lightning receptor 76 comprises a circular disk-shaped plate with a conical edge and a tubular portion 78 which is arranged concentrically to the inside thereof and comprises an external thread which is screwed into an internal thread 52 of a tubular portion 50 of a connection body 38. In this case, the end face of the tubular portion 78 of each lightning receptor 76 abuts against the disk-shaped base plate of a connection body 38 which forms a stop and determines the relative position of the lightning receptor 76 with respect to the connection and fastening unit 32. The stop is arranged such that the circular disk-shaped plates of the lightning receptors 76 abut substantially against one of the first cover layers 16 of the relevant half shell 62, 64 or it is possible to seal a small joint created there in a simple manner.

Figures 9, 10:
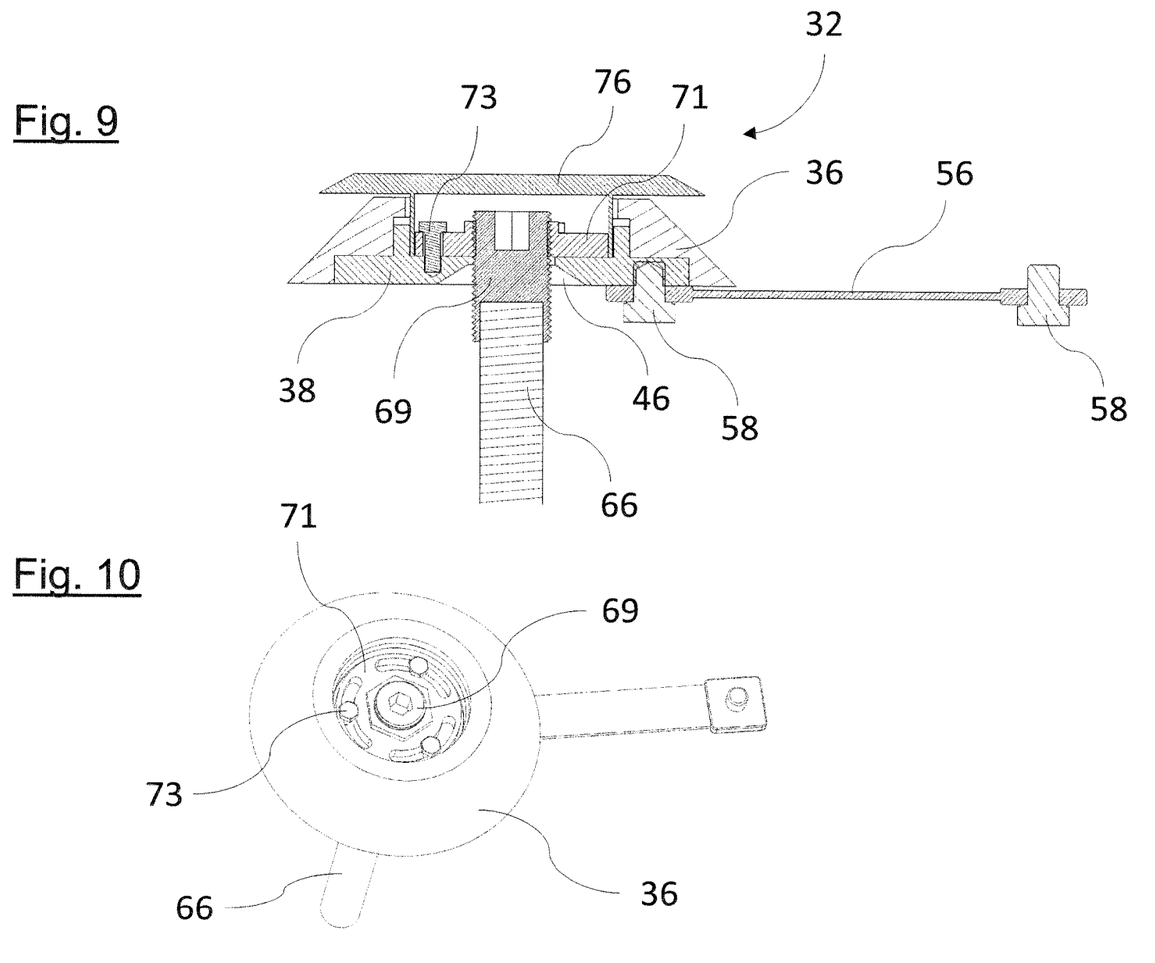
FIG. 9 shows a sectional representation of a further embodiment of a connection and fastening unit.
FIG. 10 shows a perspective view of the arrangement from FIG. 9.

FIG. 9 shows one of the connection and fastening units 32 with the lightning receptor 76 from FIGS. 7 and 8 inserted, with a further configuration of the solution for fastening the connection conductor 66 on the connection and fastening unit 32. The connection conductor 66 is mounted prior to the screwing-in of the lightning receptor 76.

On its two ends, the connection conductor 66 comprises connection pieces 69 which each comprise an external thread. Each one of the connection pieces 69 is arranged inside the through opening 46 of the connection body 38. A threaded disk 71, which is produced from metal and comprises a central opening with an internal thread, is arranged on the end face of the connection piece 69. The threaded disk 71 is screwed onto the external thread of the connection piece 69. In order to be able to attach corresponding tools, the threaded disk 71 comprises a shoulder which is realized as an external hexagon, and the connection piece 69 comprises, on its end face, an opening in the form of an internal hexagon. Once inserted, the threaded disk 71, in turn, abuts against an inside surface of a disk-shaped base plate of a connection body 38 and is screw-connected to the base plate by means of threaded bolts 73. Adding spacers is not necessary in this realization as the threaded disk 71 can be screwed onto the connection piece 68 until the connection conductor 66 is sufficiently clamped. The threaded disk 71 comprises three elongated apertures into which the threaded bolts 73 are inserted. This can be seen the best in FIG. 10.

Figure 11:
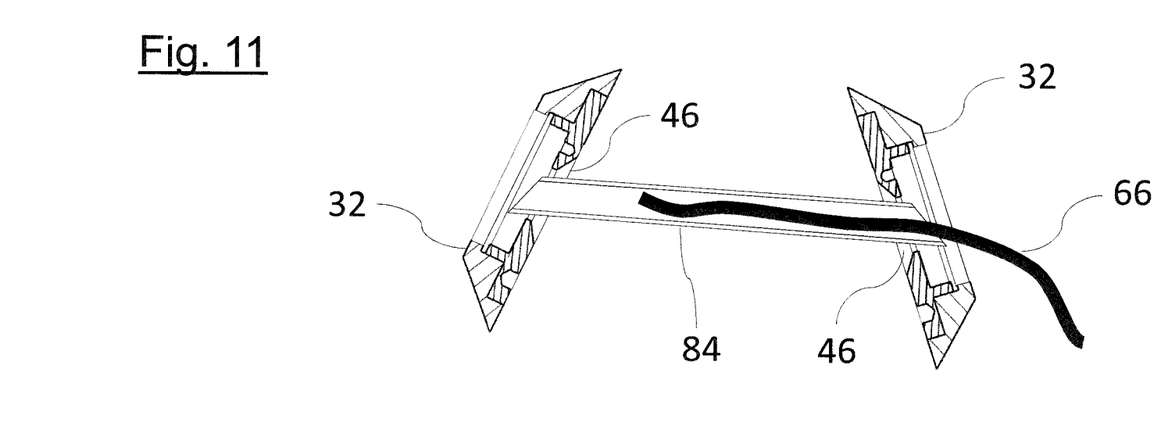
FIG. 11 shows a schematic cross-sectional representation of the insertion of a connection conductor by means of a guide tube; and, FIG. 12 shows a schematic cross-sectional representation of the insertion of a connection conductor by means of a combination of a guide wire and a guide cable.

FIG. 11 shows a first alternative to the realization of the method step in which the connection conductor 66 is inserted from an outside surface of the wind turbine rotor blade through a through opening 46 in one of the two connection and fastening units 32 into the interior of the wind turbine rotor blade. A guide tube 84 is first of all inserted through the through openings 46 in both connection and fastening units 32 for this purpose. The connection conductor 66 is then pushed forward through the guide tube 84. The removal of the guide tube 84 again afterwards is then provided.

Figure 12:
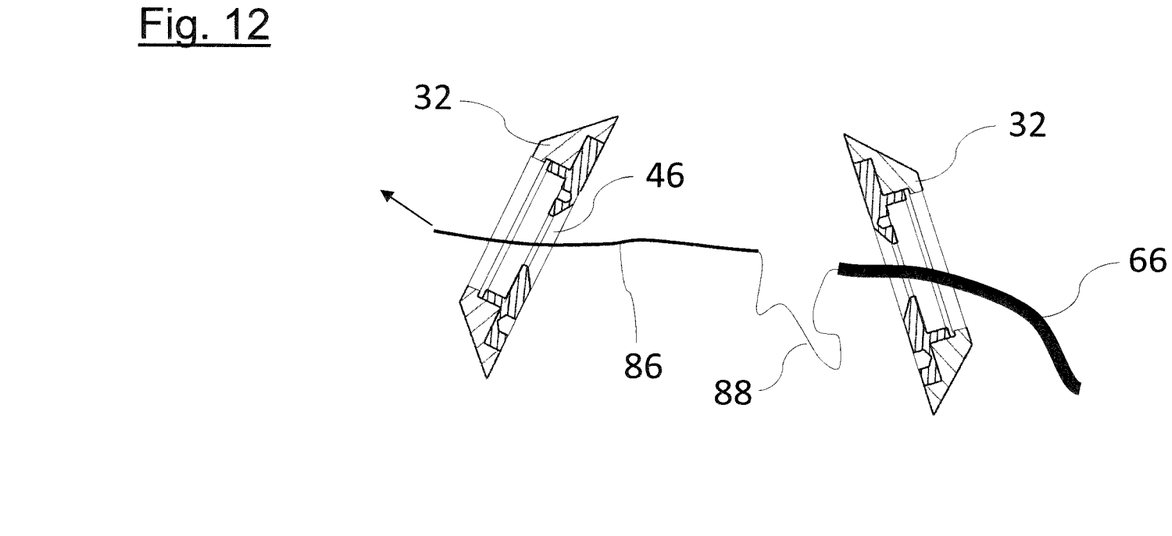

FIG. 12 shows an alternative to the insertion of the connection conductor 66, where a combination of a guide wire 86 and a guide cable 88 is used. In this case, a guide wire 86 is guided through the through openings 46 in both connection and fastening units 32. The connection conductor is fastened on the guide wire 86 by means of a guide cable 88 such that the connection conductor can be moved to the oppositely situated through opening 46 as a result of pulling on the guide wire 86.

It is understood that the foregoing description is that of the preferred embodiments of the invention and that various changes and modifications may be made thereto without departing from the spirit and scope of the invention as defined in the appended claims.

LIST OF REFERENCE SIGNS USED

10 Manufacturing mold
12 Profile trailing edge
14 Profile leading edge
16 First cover layer
18 Main spar cap
20 First leading-edge-side insert
22 Second leading-edge-side insert
24 First trailing-edge-side insert
26 Second trailing-edge-side insert
28 Lightning conductor
30 Recess
32 Connection and fastening unit
34 Conical circumferential surface
36 Basic body
38 Connection body
40 Cavity
42 Blind plug
44 Circular surface
46 Through opening
48 Second cover layer
50 Tubular portion
52 Internal thread
54 Threaded bore
56 Connecting piece
58 Threaded bolt
60 Further threaded bore
62 Half shell
64 Further half shell
66 Connection conductor
68 Connection piece
69 Connection piece with external thread
70 Perforated disk
71 Threaded disk
72 Threaded bolt
73 Threaded bolt
74 Spacer
76 Lightning receptor
78 Tubular portion
80 Bore
82 Wall
84 Guide tube
86 Guide wire
88 Guide cable

What is claimed is:

1. A method for making an equipotential bonding connection between two components of a lightning protection arrangement of a wind turbine rotor blade, the method comprising the following steps to be performed in a sequence set forth below: a) providing a wind turbine rotor blade which includes two rotor blade half shells with each half shell having a connection and fastening unit connectable to one of the two components of the lightning protection arrangement, wherein a space is provided in an interior of the wind turbine rotor blade between the two connection and fastening units; b) inserting a connection conductor from outside of the wind turbine rotor blade through a through opening in one of the two connection and fastening units into the interior of the wind turbine rotor blade; and, c) fastening two ends of the connection conductor to corresponding ones of the connection and fastening units such that the connection conductor bridges the space; wherein one of the two components is a lightning receptor 20 which, after step c), is fastened on one of the connection and fastening units.

2. The method of claim 1, wherein, in step a), the two rotor blade half shells are connected together; wherein the step b) is performed after the two rotor blade half shells have been connected together.

3. A method for making an equipotential bonding connection between two components of a lightning protection arrangement of a wind turbine rotor blade, the method comprising the following steps to be performed in a sequence set forth below: a) providing a wind turbine rotor blade which includes two rotor blade half shells with each half shell having a connection and fastening unit connectable to one of the two components of the lightning protection arrangement, wherein a space is provided in an interior of the wind turbine rotor blade between the two connection and fastening units; b) inserting a connection conductor from outside of the wind turbine rotor blade through a through opening in one of the two connection and fastening units into the interior of the wind turbine rotor blade; c) fastening two ends of the connection conductor to corresponding ones of the connection and fastening units such that the connection conductor bridges the space; wherein the other of the two connection and fastening units also includes a through opening and, in step b), one of the two ends of the connection conductor is guided through said through opening of the other one of the two connection and fastening units outside of the wind turbine rotor blade again; and, wherein, in step b), a guide wire or a guide rope is first guided through the two through openings, by way of which guide wire or guide rope, the connection conductor is guided through the two through openings.

4. The method of claim 1, wherein, in step a), the two rotor blade half shells are connected together; and, wherein at least one of the two connection and fastening units has been, prior to the two rotor blade half shells being connected together, embedded in a wall of one of the rotor blade half shells and has been connected to one of the two components of the lightning protection arrangement.

5. The method of claim 4, wherein said at least one connection and fastening unit is disposed between two cover layers of the wall during the embedding process.

6. The method of claim 4, wherein the one of the two components is a lightning protector conductor, which is integrated into a corresponding one of the rotor blade half shells in which the at least one connection and fastening unit is embedded.

7. The method of claim 1, wherein the through opening used in step b) is exposed from the outside of the wind turbine rotor blade after the connection and fastening unit, which includes the through opening, has been located from the outside of the wind turbine rotor blade.

8. The method of claim 7, wherein, prior to step b), a cavity, which is closed in an air-tight manner, of the connection and fastening unit, which includes the through opening, is bored open for exposing the through opening.

9. The method of claim 1, wherein the other of the two connection and fastening units also includes a through opening and, in step b), one of the two ends of the connection conductor is guided through said through opening of the other one of the two connection and fastening units outside of the wind turbine rotor blade again.

10. A method for making an equipotential bonding connection between two components of a lightning protection arrangement of a wind turbine rotor blade, the method comprising the following steps to be performed in a sequence set forth below: a) providing a wind turbine rotor blade which includes two rotor blade half shells with each half shell having a connection and fastening unit connectable to one of the two components of the lightning protection arrangement, wherein a space is provided in an interior of the wind turbine rotor blade between the two connection and fastening units; b) inserting a connection conductor from outside of the wind turbine rotor blade through a through opening in one of the two connection and fastening units into the interior of the wind turbine rotor blade; c) fastening two ends of the connection conductor to corresponding ones of the connection and fastening units such that the connection conductor bridges the space; wherein the other of the two connection and fastening units also includes a through opening and, in step b), one of the two ends of the connection conductor is guided through said through opening of the other one of the two connection and fastening units outside of the wind turbine rotor blade again; and, wherein, in step b), a guide tube is first guided through the two through openings, in which guide tube the connection conductor is arranged or through which guide tube the connection conductor is pushed forward, the guide tube then being removed again.

11. The method of claim 3, wherein one of the two components is a lightning receptor which, after step c), is connected to one of the connection and fastening units.

12. The method of claim 1, wherein, in step c), a length of the connection conductor is selected and the two ends of the connection conductor are fastened so as to cause the connection conductor, which is fastened at both ends, to span the space in a substantially straight line.

13. The method of claim 1, wherein, in step c), the two ends of the connection conductor are fastened from the outside of the wind turbine rotor blade to corresponding ones of the two connection and fastening units.

14. The method of claim 1, wherein, in step c), at least one of the two ends of the connection conductor is screw-connected to a perforated disk, a diameter of which is greater than the through opening and which abuts against an outside surface of the corresponding one of the connection and fastening units.

15. The method of claim 14, wherein one or multiple spacer disks are arranged between the perforated disk and the corresponding one of the connection and fastening units.

16. The method of claim 10, wherein one of the two components is a lightning receptor which, after step c), is fastened on one of the connection and fastening units.

* * * * *

UNITED STATES PATENT AND TRADEMARK OFFICE
CERTIFICATE OF CORRECTION

PATENT NO. : 10,697,441 B2
APPLICATION NO. : 15/853269
DATED : June 30, 2020
INVENTOR(S) : H. Klein et al.

Page 1 of 1

It is certified that error appears in the above-identified patent and that said Letters Patent is hereby corrected as shown below:

In the Claims

In Column 14:
Line 36 Claim 1: delete "20".

Signed and Sealed this
Twenty-fifth Day of August, 2020

Andrei Iancu
*Director of the United States Patent and Trademark Office*